US011323766B2

(12) United States Patent
Lassure et al.

(10) Patent No.: US 11,323,766 B2
(45) Date of Patent: May 3, 2022

(54) METHOD AND DEVICE FOR PROVIDING AUDIO/VIDEO CONTENT TO A RENDERING DEVICE

(71) Applicant: Dolby International AB, Amsterdam Zuidoost (NL)

(72) Inventors: Gael Lassure, Fuerth (DE); Tobias Heinl, Nuremberg (DE); Christian Schindler, Nuremberg (DE)

(73) Assignee: Dolby International AB, Amsterdam Zuidoost (NL)

(*) Notice: Subject to any disclaimer, the term of this patent is extended or adjusted under 35 U.S.C. 154(b) by 0 days.

(21) Appl. No.: 17/062,442

(22) Filed: Oct. 2, 2020

(65) Prior Publication Data
US 2021/0105530 A1    Apr. 8, 2021

Related U.S. Application Data

(60) Provisional application No. 62/909,875, filed on Oct. 3, 2019.

(51) Int. Cl.
| | |
|---|---|
| *H04N 7/18* | (2006.01) |
| *H04N 21/4363* | (2011.01) |
| *H04N 21/231* | (2011.01) |
| *H04L 65/60* | (2022.01) |
| *H04N 21/6373* | (2011.01) |
| *H04N 21/238* | (2011.01) |

(52) U.S. Cl.
CPC ..... *H04N 21/43635* (2013.01); *H04L 65/601* (2013.01); *H04N 21/23103* (2013.01); *H04N 21/23805* (2013.01); *H04N 21/6373* (2013.01)

(58) Field of Classification Search
CPC ....... H04N 21/43635; H04N 21/23103; H04N 21/6373; H04N 21/23805; H04N 21/4104; H04N 21/6582; H04N 21/4344; H04N 21/43076; H04N 21/43079
See application file for complete search history.

(56) References Cited

U.S. PATENT DOCUMENTS

| | | | | |
|---|---|---|---|---|
| 8,175,298 | B2 * | 5/2012 | Mitani | H04N 5/44 381/123 |
| 8,201,211 | B2 * | 6/2012 | Proust | G06F 21/575 725/140 |
| 8,238,726 | B2 | 8/2012 | Takatsuji | |
| 8,351,624 | B2 * | 1/2013 | Motomura | H04N 21/43635 381/123 |
| 8,451,375 | B2 * | 5/2013 | Ejima | H04N 21/4307 348/515 |

(Continued)

*Primary Examiner* — Michael B. Pierorazio (57) ABSTRACT

The present document describes a method (500) for providing combined audio and video content from a source device (210) to an audio sink device (230) and to a video sink device (220). The method (500) comprises determining (501) latency information regarding the video latency for processing the video content and the audio latency for processing the audio content of the combined audio and video content along the device chain (100) between the source device (210) and the audio and video sink devices (220, 230). Furthermore, the method (5009 comprises delaying (502) the audio content or the video content in dependence of the latency information, and providing (503) the combined audio and video content with the delayed audio content or the delayed video content.

20 Claims, 6 Drawing Sheets

(56) References Cited

U.S. PATENT DOCUMENTS

| | | | |
|---|---|---|---|
| 8,692,937 B2* | 4/2014 | Altmann | H04N 21/4307 348/513 |
| 8,922,713 B1* | 12/2014 | Chakrovorthy | H04N 21/4307 348/515 |
| 9,247,289 B2* | 1/2016 | Ichimura | H04N 5/04 |
| 9,509,887 B2* | 11/2016 | Leyendecker | H04N 5/04 |
| 9,626,308 B2* | 4/2017 | Colenbrander | G06F 9/4411 |
| 10,142,521 B2 | 11/2018 | Winsvold | |
| 2006/0140265 A1* | 6/2006 | Igler | H04N 21/42646 375/240.01 |
| 2006/0149850 A1* | 7/2006 | Bowman | H04N 21/43615 709/231 |
| 2006/0242314 A1* | 10/2006 | Logvinov | H04N 21/439 709/231 |
| 2007/0046835 A1* | 3/2007 | Kim | H04N 5/4403 348/731 |
| 2008/0063216 A1* | 3/2008 | Sakata | H04L 7/041 381/80 |
| 2008/0320545 A1* | 12/2008 | Schwartz | H04N 21/8541 725/135 |
| 2009/0091655 A1* | 4/2009 | Russell | H04N 21/2368 348/515 |
| 2010/0315553 A1* | 12/2010 | Takatsuji | G09G 5/006 348/516 |
| 2010/0321479 A1* | 12/2010 | Yang | H04N 13/398 348/51 |
| 2011/0051002 A1* | 3/2011 | Oh | H04N 5/765 348/569 |
| 2011/0068736 A1* | 3/2011 | Chartier | H02J 7/00 320/107 |
| 2011/0134338 A1* | 6/2011 | Toba | H04L 12/2838 348/734 |
| 2011/0142245 A1* | 6/2011 | Toba | H04N 5/60 381/22 |
| 2011/0176057 A1* | 7/2011 | Okamura | H04N 5/44 348/554 |
| 2011/0234916 A1* | 9/2011 | Fujita | H04N 21/4135 348/738 |
| 2012/0002562 A1* | 1/2012 | Kawade | H04N 5/765 370/252 |
| 2012/0042346 A1* | 2/2012 | Yoshida | H04N 21/439 725/81 |
| 2012/0133829 A1* | 5/2012 | Nakade | H04N 5/04 348/515 |
| 2012/0136612 A1* | 5/2012 | Vanderhoff | H04N 5/765 702/119 |
| 2012/0188456 A1* | 7/2012 | Kuroyanagi | H04N 5/765 348/569 |
| 2013/0021536 A1* | 1/2013 | Kamida | H04N 21/43622 348/739 |
| 2013/0051578 A1* | 2/2013 | Chu | H04B 1/123 381/94.1 |
| 2013/0051584 A1* | 2/2013 | Higuchi | H04N 21/4122 381/123 |
| 2013/0201397 A1* | 8/2013 | Ayoub | H04R 5/04 348/515 |
| 2014/0193134 A1* | 7/2014 | Maeda | H04N 21/43632 386/231 |
| 2015/0074729 A1* | 3/2015 | Kim | H04N 21/44227 725/80 |
| 2015/0077633 A1* | 3/2015 | Lee | H04N 21/4307 348/515 |
| 2015/0237441 A1* | 8/2015 | Muramatsu | H04R 3/12 381/120 |
| 2017/0094342 A1* | 3/2017 | Lugtenberg | H04N 21/4312 |
| 2017/0244927 A1* | 8/2017 | Kim | H04N 5/765 |
| 2018/0278811 A1* | 9/2018 | Winsvold | H04N 21/8106 |

* cited by examiner

METHOD AND DEVICE FOR PROVIDING AUDIO/VIDEO CONTENT TO A RENDERING DEVICE

CROSS-REFERENCE TO RELATED APPLICATIONS

This application claims priority to US provisional application 62/909,875, filed Oct. 3, 2019, which is hereby incorporated by reference.

TECHNICAL FIELD

The present document relates to the rendering of audio/video (AV) content.

BACKGROUND

AV content may be provided from a source device, such as a receiver or a settop box, to an audio renderer and a video renderer (which may be combined within a single rendering device or which may be implemented in separate rendering devices). The AV content may be provided using a transmission interface such as HDMI (High-Definition Multimedia Interface).

The device chain for the AV content may exhibit latencies for the audio content and/or for the video content, wherein the audio latency for the audio content may differ from the video latency for the video content. By way of example, the audio content may be transmitted in a compressed format, and the video content may be transmitted in an uncompressed format. Such a situation may lead to an additional decoding latency for the audio content, and, by consequence, to a device chain having an audio latency which is higher than the video latency.

Differences in the audio latency and in the video latency may lead to relatively high buffering requirements and costs for the audio renderer and/or the video renderer. The present document addresses the technical problem of reducing the buffering requirements and/or the costs of the audio renderer and/or the video renderer within a device chain for AV content.

SUMMARY

According to an aspect, a method for providing combined audio and video (AV) content from a source device to an audio sink device (for rendering the audio content) and to a video sink device (for rendering the video content) is described. The method comprises determining latency information. The latency information may be indicative of: the video latency for processing the video content of the combined audio and video content along a video device chain between the source device and the video sink device; and/or the audio latency for processing the audio content of the combined audio and video content along an audio device chain between the source device and the audio sink device; and/or the difference between the video latency and the audio latency.

Furthermore, the method comprises delaying the audio content or the video content in dependence of the latency information. In addition, the method comprises providing (e.g. transmitting or sending) the combined audio and video content with the delayed audio content or the delayed video content.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

According to another aspect, a source device configured to provide combined audio and video content to an audio sink device and to a video sink device is described. The source device is configured to determine latency information. The latency information may be indicative of or may comprise: the video latency for processing the video content of the combined audio and video content along a video device chain between the source device and the video sink device; and/or the audio latency for processing the audio content of the combined audio and video content along an audio device chain between the source device and the audio sink device; and/or the difference between the video latency and the audio latency.

Furthermore, the source device is configured to delay the audio content or the video content in dependence of the latency information, and to provide the combined audio and video content with the delayed audio content or the delayed video content.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein.

DETAILED DESCRIPTION

Figure 1:
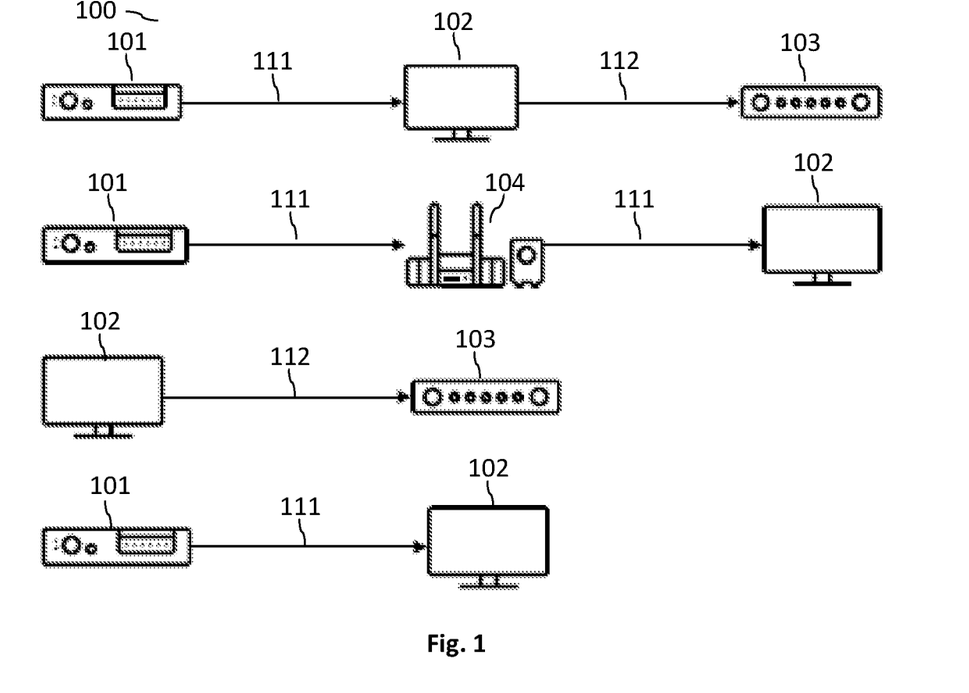
FIG. 1 shows example device chains for AV content.

As outlined above, the present document is directed at providing AV content to an audio renderer and to a video renderer in a reliable and efficient manner. In this context, FIG. 1 shows example device chains 100 for AV content. The uppermost device chain 100 of FIG. 1 comprises a settop box or a receiver 101 as a source device. The AV content is provided to a video rendering device 102 via a first transmission interface 111 (wherein the first transmission interface 111 may be adapted to transmit audio content and video content). The first transmission interface 111 may comprise or may be HDMI. The video rendering device 102 (e.g. a TV set) may forward the audio content via a second transmission interface 112 to an audio rendering device 103 (e.g. to a soundbar). The second transmission interface 112 may be adapted to transmit audio content. The second transmission interface 112 may e.g. be the ARC (Audio Return Channel) or the eARC (extended ARC) of HDMI and/or a wireless link (such as Wifi or WLAN (Wireless Local Area Network), BT (Bluetooth) and/or WiSA (Wireless Speaker and Audio Association)). When using a wireless link, an ad-hoc protocol may be used to query or to determine latency information with regards to a sink device or end point.

The second device chain 100 of FIG. 1 comprises a receiver or settop box 101 as a source device. The AV content is transmitted via the first transmission interface 111 (e.g. HDMI) to an audio/video rendering device 104 which is configured to forward the video content via the first transmission interface 111 to a video rendering device 102 (e.g. a TV set). The third device chain 100 of FIG. 1 comprises an audio/video rendering device 102 (with a receiver) as a source device. The audio content may be transmitted to an audio rendering device 103 via the second transmission interface (e.g. ARC or eARC). The fourth device chain 100 of FIG. 1 comprises a receiver or settop box 101 as a source device, wherein the AV content is transmitted via the first transmission interface (e.g. HDMI) to an audio/video rendering device 102 (e.g. a TV set).

The different device chains 100 typically exhibit different audio latencies for the audio content and/or different video latencies for the video content, depending on the difference devices 101, 102, 103, 104 which are used within the respective device chain 100. Alternatively, or in addition, a device chain 100 may be configured to provide AV content with different formats, i.e. the device chain 100 may be operated in different AV modes (also referred to herein as AV rendering modes). The audio latency and/or the video latency may vary depending on the AV mode which is used within the device chain 100.

A possible solution for handling latency, notably for handling the difference between audio latency and video latency, within a device chain 100 is to provide an audio rendering device and/or a video rendering device with a buffer for buffering audio content and/or video content, respectively. Buffering of (uncompressed) audio and/or video content requires relatively large storage units, thereby increasing the cost of an audio rendering device and/or of a video rendering device.

In the present document, a latency indication protocol (LIP) is described, which enables a source device to determine latency information regarding the audio latency and/or the video latency for a particular device chain 100 and/or for a particular AV mode. The latency information may be used by the source device to delay the audio content or the video content such that buffering requirements for an audio rendering device and/or for a video rendering device are reduced and/or removed. In particular, the difference between the audio latency and the video latency of a device chain 100 may at least partially or fully be compensated at the source device.

Figure 2:
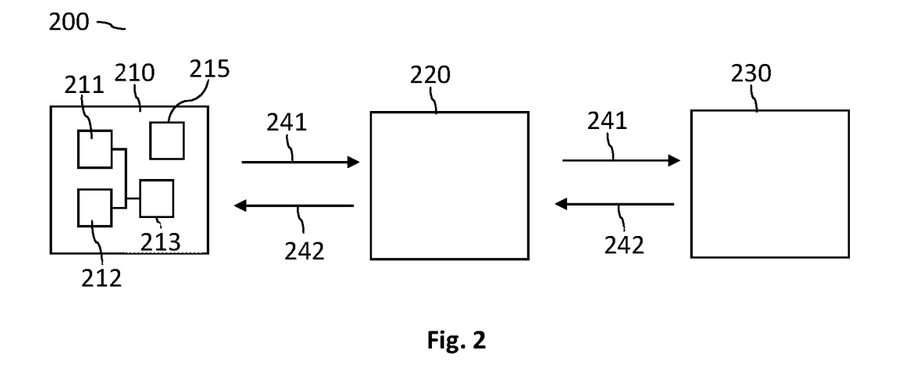
FIG. 2 shows a block diagram of a (partial) device chain.

FIG. 2 shows a block diagram of an excerpt 200 of a device chain 100. The device chain 100 comprises a source device 210, a video sink device 220 and an audio sink device 230. It should be noted that the complete device chain 100 from the source device 210 to the respective sink devices 220, 230 may comprise one or more additional intermediate devices (not shown in FIG. 2), which are located between the source device 210 (for providing the AV content) and the sink devices 220, 230 (for rendering the audio and/or video content).

A source device 210 may send a downstream message 241 to a sink device 220, 230 (directly or indirectly). Furthermore, a sink device 220, 230 may send an upstream message 242 to a source device 210 (directly or indirectly). The messages 241, 242 may be used to
  determine whether or not a sink device 220, 230 supports the LIP protocol;
  determine an identifier of a device 220, 230 within the device chain 100 or an identifier of the complete device chain 100 or an identifier of a part of the device chain 100; the identifier may uniquely identifier a (partial) device chain 100;
  determine a configuration of the device chain 100; and/or
  determine latency information regarding the device chain 100.

The source device 210 may comprise a buffer 213 configured to buffer the audio content 211 and/or the video content 212 based on the latency information.

The Latency Indication Protocol (LIP) may be used for improved audio/video synchronization, notably when the audio and video content (or assets) are decoded and rendered on different devices 220, 230 which are interconnected via HDMI. With the knowledge of downstream latencies, a source device 210 can optimally compensate the difference between the audio latency and the video latency and ensure a proper AN synchronization at the one or more rendering points (possibly without the need of buffering the audio content and/or the video content). The LIP protocol provides means for fully characterizing the downstream audio and video latencies along the entire device chain 100 from the audio/video source device 210 until the final rendering device 220, 230.

In an example device chain 100 a TV set may be the source device 210 and the audio content may be rendered on an AVR (AV receiver) and/or a soundbar (wherein the video content is directly rendered on the TV set). The audio content may be transmitted using ARC or eARC. Upon request, the audio receiver (as the audio sink device 230) may report its audio latency to the TV set (as the source device 210). The TV may delay the video content, if the audio latency is larger than the video latency. On the other hand, the TV may delay the audio content if the video latency is larger than the audio latency.

In another example, a source device 210 (e.g. a settop box) may be directly connected to a TV set (as a combined audio and video sink device 220, 230) via HDMI. Upon request, the TV set may report the audio latency and/or the video latency to the source device 210. The source device 210 may delay the video content if the audio latency is larger than the video latency. Alternatively, the source device 210 may delay the audio content if the video latency is larger than the audio latency.

In another scenario, the TV set may operate as a hub (i.e. as an intermediate device for the audio content). The source device 210 may be a settop-box, an optical disk player, a video recorder or a game console connected directly to the TV set (e.g. via HDMI). The audio content may be rendered on the TV set or on an addition audio/video receiver (using e.g. a ARC or eARC link). When active, the AVR may report its audio latency to the TV set. The TV set may report to the source device 210 its video latency and its audio latency plus the audio latency of the AVR. The source device 210 may delay its video content if the audio latency is larger than the video latency. Alternatively, the source device 210 may delay its audio content if the video latency is larger than the audio latency.

In another scenario, the Audio Video Receiver (AVR) may be operated as a hub. The source device 210 may be a settop-box, an optical disk player, a video recorder or a game console, connected directly to the AVR. The audio may be rendered on the AVR. The TV set may report its video latency to the AVR. The AVR may report to the source device 210 its audio latency and its video latency plus the video latency of the TV set. The source device 210 may delay its video content if the audio latency is larger than the video latency. Alternatively, the source device 210 may delay its audio content if the video latency is larger than the audio latency.

The LIP protocol may leverage the CEC (Consumer Electronics Control) communication channel of HDMI and/or the open vendor-specific commands as defined by the HDMI v1.4*b* specification or higher. The different devices within a CEC network may be defined by their respective physical address and by their respective logical address.

A unique physical address (which may be made up of four hexadecimal digits) may be given by a downstream device within a device chain 100 to each of the upstream devices within the device chain 100. The physical address may be given through the Vendor Specific Data Block (VSDB) in the E-EDID (Enhanced-Extended Display Identification Data). The EDID is a data structure, standardized by the Video Electronics Standards Association (VESA), which enables an HDMI sink device 220, 230 to inform an HDMI source device 210 about its identity and capabilities prior to transmission of audio and video data via TMDS (Transition-Minimized Differential Signaling).

By way of example, a TV set (as a sink device 220, 230) may assign itself the address 0.0.0.0 and may act as the HDMI CEC root device. Furthermore, the TV set may assign the addresses 1.0.0.0, 2.0.0.0, and so on, to the one or more intermediate devices and to the source device 210, which are located on the device chain 100 upstream to the TV set. A repeater device (such as an AVR), i.e. an intermediate device, may subsequently define the address 'x' of each of its own upstream device based on its own physical address, e.g. 1.x.0.0 if its own physical address is 1.0.0.0. Hence, by using this scheme, unique physical addresses may be assigned to the devices of a device chain 100 (notably for a device chain 100 which comprises four device levels or less).

Each device may define its own 4-bit logical address based on its purpose within the network or within the device chain 100. When devices have the same purpose, for example two settop boxes connected to a TV, a device may be configured to select a logical address (for example, among "Tuner 1" to "Tuner 4") that has not yet been picked by another device of the same type. This may be achieved by sending a polling CEC message to a potential device with the <tuner x> logical address until no acknowledgement response is received. If no acknowledgement response is received, the logical address (for which no acknowledgement has been received) may be assumed to be available and the polling device make select this logical address.

A source device 210 may be configured to verify the physical to logical address mapping by sending a standard <Get Physical Address> message to a specific logical address. When the source device's address is X.0.0.0 then it may be concluded that the immediate downstream device is the TV set (for rendering the audio and/or video content).

The LIP protocol may be such that it is assumed that there is one and only one TV set (for rendering video content) within the device chain 100 (notably within the HDMI CEC chain) and at most one audio system (for rendering the audio content) which is connected directly to the TV set. The TV set may be assigned the physical address 0.0.0.0 and may respond to the logical address "TV" (0x0). The TV set may assign the physical address X.0.0.0 (X≠0) to an audio receiver. The audio receiver may respond to the logical address "Audio System" (0x5).

When being turned on, the audio receiver may broadcast a <Report Physical Address> [physical address] and a <Set System Audio Mode>[on] message (according to the CEC specification). A source device 210 within the device chain 100 may monitor these messages and update its own "view" of the chain 100 if its physical address is X.Y.Z.W (i.e. if it is upstream from the audio receiver). A TV set may monitor these messages. When switching the audio path to render the audio content on an ARC or eARC connected audio receiver, the TV set may update its audio latency with the latency information that it receives from the audio receiver.

A device may determine the physical address of its immediate and/or next downstream device by zeroing the first non-zero nibble of its own physical address.

The LIP protocol is preferably a point-to-point (P2P) protocol enabling a device within a device chain 100 to talk to a downstream device within the device chain 100. The devices within a device chain 100 may keep track of a map between the physical address and the logical address of the respective one or more downstream devices, because the source device 210 is typically expected to query latency information by point-to-point addressing using the logical address.

If there is more than one device between the source device 210 and the video sink device 220 (e.g. the TV set), then a source device 210 with the physical address X.Y.Z.0 may first try to establish LIP support of the immediate downstream device (i.e. the device with the physical address X.Y.0.0). If this device does not answer or answers that it does not understand, then the source device 210 may ask the next device (with physical address X.0.0.0) until it reaches the video sink device 220 (with physical address 0.0.0.0).

An audio receiver (i.e. the audio sink device 230) which is connected via ARC or eARC to the video sink device 220 (e.g. the TV set) may be considered as downstream with respect to the video sink device 220. In this case, the video sink device 220 may query the LIP support from the audio sink device 230 and if supported may receive the audio latency from the audio sink device 230.

The LIP protocol may define a dedicated message 241 for querying the capability of the devices along a device chain 100.

An ARC and eARC connected audio receiver device may be expected to be logically addressed as an "audio system". A TV set may thus query the LIP capability of an audio receiver by a directed CEC message.

The LIP protocol may enable a device to send a cumulative downstream latency report to an upstream device. The source device 210 of a device chain 100 may expect to receive a report comprising the total latency from the HDMI output of the source device 210 to the rendering end-point (of the sink devices 220, 230).

A TV set with an additional audio receiver may report to its one or more upstream devices its own video latency and the total audio latency by adding up its own audio latency and the audio latency reported by the ARC or eARC connected audio receiver. In a similar manner, an intermediate AVR (with a connected TV set) may report to its one or more upstream devices its own audio latency and the total video latency by adding up its own video latency and the video latency reported by the TV set.

The LIP commands of the LIP protocol may be defined with "minimal" payload to avoid redundancy while answering requests. A LIP command may extend a CEC "Vendor Command with ID" command (CEC opcode=0xA0), e.g. using the Dolby vendor ID (0x00D046, as defined in http://standardsoui.ieee.org/oui.txt).

A message 241, 242 of the LIP protocol may have the structure: [Initiator, Target] [0xA0] [Dolby vendor ID=00:D0:46][LIP opcode][Parameters]. The following Table 1 shows example messages of the LIP protocol.

TABLE 1

| opcode | Value | Description | Parameters | Parameter Description | Response |
|---|---|---|---|---|---|
| <Request LIP support> | 0x10 | Ask the downstream device if it supports LIP. | | | <Report LIP support> |
| <Report LIP support> | 0x11 | Confirms that LIP is supported. | [UUID] [a/v rendering mode] [video latency] [audio latency] | Reports a unique identifier enabling to associate reported latencies to the current device chain. | |
| <Update UUID> | 0x12 | Update the UUID | [UUID] [a/v rendering mode] [video latency] [audio latency] | Reflects a change in the downstream playback chain by sending the new unique identifier. Example: switching the TV from speaker rendering to ARC rendering | |
| <Update Latencies> | 0x13 | Reports that a user config change occurred and provide new latencies. | [a/v rendering mode] [video latency] [audio latency] | [rendering mode] reflects whether the downstream device plays audio on its own speakers or not and device's specific user audio/video settings. When rendering the audio on external speakers (ARC or eARC case), the device should report the user audio specific settings reported by the AVR. Updated latencies for currently playing audio and video formats are sent. | |
| <Request audio-and-video latency> | 0x14 | Request the audio and video latency for a given video and audio format. | [video format] [color format] [low latency mode] [audio format] ([audio format extension]) | [audio format] as per bit[0 . . . 4] of audio codec-specific 'PC' field as defined in IEC 61937-2. [audio format extension] is optional. | <Report audio-and-video latency> |
| <Report audio-and-video latency> | 0x15 | The device reports its audio and video latency for the specified audio and video format in the specified processing mode. The reported latency takes into account any further downstream latencies. | [video latency] [audio latency] | | |
| <Request audio latency> | 0x16 | The TV requests the audio latency of the audio receiver connected via ARC or eARC | [2 bit-reserved] [low latency mode] [audio format] ([audio format extension]) | [audio format extension] is optional. | <Report audio latency> |
| <Report audio latency> | 0x17 | The audio receiver playing from its ARC or eARC input reports its audio latency for the requested audio format and processing mode | [audio latency] | | |
| <Request video latency> | 0x18 | The audio receiver requests the video latency of the downstream TV | [video format] [color format] [low latency mode] [5 bit-reserved] | | <Report video latency> |
| <Report video latency> | 0x19 | The TV reports its video latency for the requested video format and processing mode | [video latency] | | |

TABLE 1-continued

| opcode | Value | Description | Parameters | Parameter Description | Response |
|---|---|---|---|---|---|
| <Set Auto Low Latency Mode> | 0x1A | The TV sends to the ARC or eARC connected audio receiver a hint about its current processing mode (normal or low latency) | [low latency mode] | | |

Example operand descriptions are provided in Table 2.

TABLE 2

| Name | Range description | | Length | Purpose |
|---|---|---|---|---|
| [audio latency] | [0, 254]: latency in 2 ms steps between [0, 508] ms<br>255: format not supported | | 1 byte | Report the audio latency for the current or requested audio format and format extension. |
| [audio format] | For PCM audio, set to 0.<br>For compressed audio, set these as per bits [0 . . . 4] of audio codec-specific 'PC' field as defined in IEC 61937-2. | | 5 bits | Specifies the format of the audio stream that will be sent over HDMI or ARC or eARC |
| | "PCM" | 0 | | |
| | "AC3" | 1 | | |
| | "MPEG-2 AAC" | 7 | | |
| | "DTS type I" | 11 | | |
| | "DTS type II" | 12 | | |
| | "DTS type III" | 13 | | |
| | "DTS type IV" | 17 | | |
| | "eAC3" | 21 | | |
| | "MAT" | 22 | | |
| [audio format extension] | For compressed audio, as per bits [5 . . . 12] of audio codec-specific 'PC' field as defined in IEC 61937-2. | | 1 byte | For audio format whose latency depends on additional information like the frame duration (e.g. AAC or MAT), the bits[5 to 12] of the 'PC' field enables to distinguish these variants. |
| [A/V rendering mode] | "audio rendering mode" | 0 . . . 7 | 4 bits | Reflects the audio rendering user settings of the TV if playing through internal speakers, else reflects the audio rendering settings of the audio receiver. |
| | "Video rendering mode" | 0 . . . 7 | 4 bits | Reflects the video rendering user settings of the TV. |
| [color format] | "SDR" | 0 | 2 bits | When querying the audio/video latency, it enables to get feedback for different latency depending on the color processing (static or dynamic HDR vs SDR) as output by the source on the Video InfoFrames. |
| | "HDR" | 1 | | |
| | "Dolby Vision" | 2 | | |
| | "Other HDR" | 3 | | |
| [latency mode] | "normal mode" | 0 | 1 bit | This hint reflects the "Content Type" given in the info frames that the rendering device could use to trigger a low-latency processing mode or get back to a normal-latency processing mode. |
| | "low latency mode" | 1 | | |
| [UUID] | 0x000000 ≤ N ≤ 0xFFFFFF | | 3 bytes | Uniquely identifies a downstream device. |
| [video format] | as per CTA-861-G table 3. | | 1 byte | Getting the latency information for a specific video format (frame size and frame rate as per the Video Information Code written by the source on the Video Info Frame. |
| [video latency] | [0, 254]: latency in 2 ms steps between [0, 508] ms<br>255: format not supported | | 1 byte | Report the video latency for the current or requested video format and format extension. |

The LIP protocol may comprise a <Request LIP Support> message. This message may be used by a source device 210 (e.g. when being turned on) to query if a downstream device supports the LIP protocol. The source device 210 may broadcast the query with the physical address of its immediate downstream device. A TV set which is connected via ARC or eARC to an audio receiver (as a downstream device) may send this request explicitly to the device with the logical address "Audio System".

A device that receives this request from one of its upstream devices and that supports the LIP protocol may be configured to remember that this upstream device supports LIP;
report its own capability with a <Report LIP Support> message; the <Report LIP Support> message may include a reporting of the currently used audio/video rendering mode and the corresponding latencies; and/or answer any received LIP requests from this upstream device.

The LIP protocol may comprise a <report LIP support> message. This message may be sent as a response to a <Request LIP Support> message. An upstream device receiving a <report LIP support> message which announces a change of latency from a downstream device may be configured to broadcast an update of its own latency to all its upstream devices. In order to minimize the CEC traffic, the LIP protocol may enable the identification of devices using a 24-bit UUID (unique identifier). This provides a key for caching the latency information related to a given device chain 100 (within a storage unit 215). The UUID may be obtained from the 24 least significant bits of a HASH (similar to MD5) of the device E-EDID and the firmware version.

A TV set with an additional audio receiver may be configured to hash its UUID with the UUID of the ARC or eARC connected audio receiver, so that this "composite" UUID uniquely identifies the TV set+Audio Receiver HDMI chain 100.

An intermediate audio receiver with an additional TV set may be configured to hash its UUID with the UUID of the downstream TV set, so that this "composite" UUID uniquely identifies the Audio Receiver+TV HDMI chain 100.

When a TV set switches from internal speakers to ARC or eARC connected speakers (or from ARC connected speakers back to internal speakers), the TV set may be configured to emit an UUID update to the currently playing source device 210.

Whenever a user changes an audio or video setting affecting the audio and/or video latency of a device, the device may be configured to emit an <Update Current Latency> message to its LIP capable upstream device.

In order to optimize the CEC bandwidth usage, latency related commands may be defined to query and/or report both audio and video, audio only and video only latencies. A TV device querying a downstream audio receiver may be configured to query audio only latency and to expect an audio only latency report. An audio receiver querying a downstream TV set may be configured to query a video only latency and to expect a video only latency report. A generic source device may be configured to query both audio and video latencies in a single command and to expect a combined audio and video latency report.

Reported total latencies may be e.g. reported in the range of [0, 508] ms in steps of 2 ms.

It should be noted that each time the latency or operating mode changes due to a user setting change, an affected device may be configured to send to the playing source device 210 a <update latency> message with the updated audio/video rendering mode and/or with the updated latency.

HDMI 2.1 defines the concept of an Auto Low Latency Mode (ALLM), also known as the game mode. The source device 210 of a device chain 100 may be configured to give a hint to the one or more downstream devices about the content type via an AVI Info-Frame packet. A video sink device 220 which is set in ALLM may be configured to adapt its latency based on the content type.

This context-based low-latency recommendation may be forwarded to an ARC or eARC audio sink device 230, e.g. using the <Request Audio Low Latency> LIP command defined in this document. An audio receiver handling this command and "tuning" its internal processing to achieve adequate latency may be configured to send an updated <Report LIP Support> message with its updated 4 bit audio mode. When receiving such an update, the TV set may be configured to broadcast an update of the <Report LIP Support> message that contains the new 4 bit audio mode and also its own updated video mode.

The LIP protocol may be designed such that a requesting device must wait for the corresponding answer before sending a new request. In order to avoid deadlocks, a "timeout" (e.g. of 2 seconds) may be used. The LIP protocol may make use of a <feature abort> message for indicating that a request from a requesting device has not been understood by a receiving device, thereby indicating that the LIP protocol is not supported.

Hence, a device chain 100 typically comprises a source device 210 which is configured to provide (e.g. to "play") a combined audio and video content. Furthermore, the device chain 100 may comprise one or more intermediate devices which are configured to receive audio content and/or video content from an upstream device (e.g. the source device 210) and to forward the audio content and/or video content to a downstream device (e.g. a sink device 220, 230). In addition, the device chain 100 comprises an audio sink device 230 and a video sink device 220. The audio sink device 230 may be an intermediate device with regards to the video content (e.g. an AVR which forwards the video content to a TV set). Alternatively, a video sink device 220 may be an intermediate device with regards to the audio content (e.g. a TV set which forwards the audio content to an audio receiver).

Figure 3A:
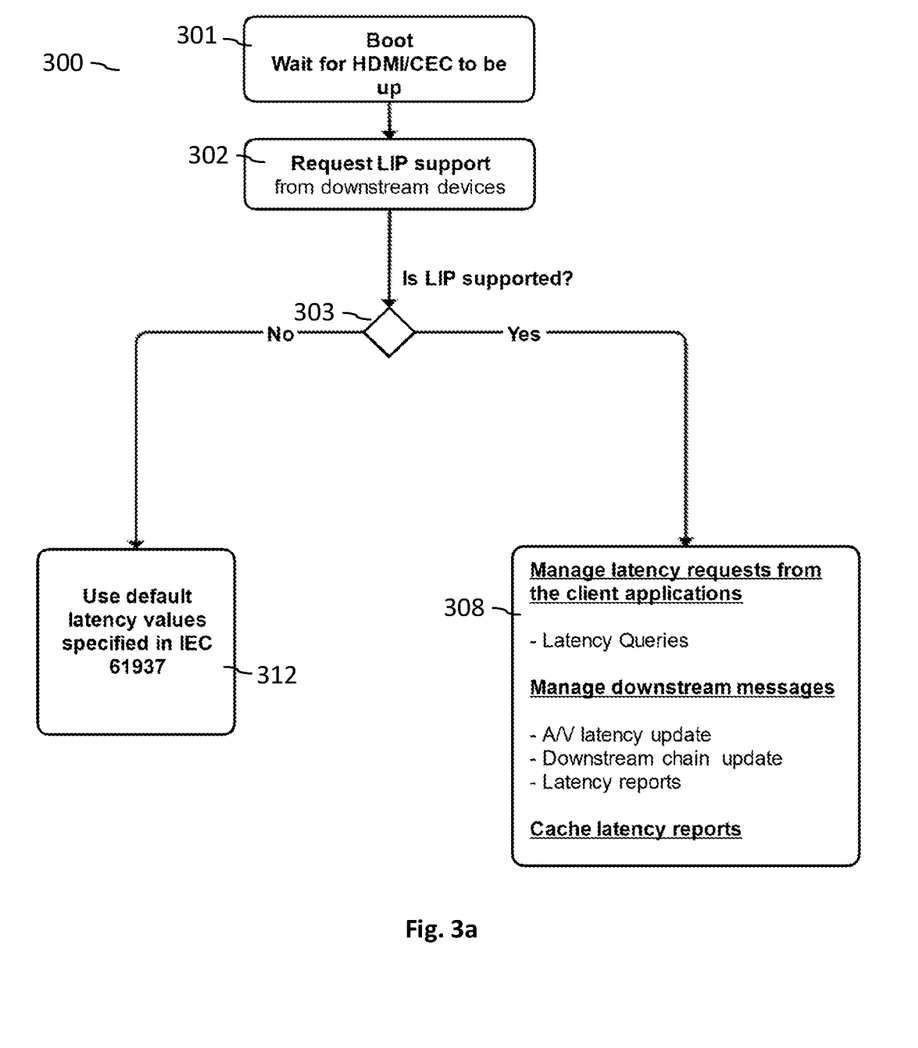
FIG. 3a shows a flow chart of an example method for determining latency information for a device chain.

FIG. 3a shows an example method 300 which may be executed during start-up of a first device 210, 220, 230 within a device chain 100. The first device 210, 220, 230 may boot and wait until the transmission interface (notably HDMI/CEC) to a downstream device of the first device is set up (step 301). Using a <Request LIP support> message, it may be verified whether the direct downstream device supports LIP (step 302). If the direct downstream device does not support LIP (step 303), the next downstream device can be queried, until the CEC root device (i.e. the sink device 220, 230) is reached. If the sink device 220, 230 has been reached, and LIP is not supported, default latency values (e.g. as specified within the IEC 61937 standard) may be used (step 312).

If a downstream device supporting LIP is found (step 303), it may be verified whether a UUID has been cached for the downstream device. If a UUID has been cached, then the stored latency information may be used. If no UUID has been cached, then the latency information may be determined (e.g. using a <request latency> message), and the determined latency information may be cached (step 308).

During operation of the first device, the device may verify whether the downstream device chain changes, notably with regards to audio latency and/or video latency, and/or with regards to the support of LIP.

Furthermore, a method is described, which may be executed by a second device (which is downstream of the first device). The second device may wait for a <Request LIP support> message from the first device. Subject to receiving such a message, it may be verified whether the audio sink device 230 and/or the video sink device 220 is located further downstream of the second device. If the audio sink device 230 and/or the video sink device 220 is located further downstream of the second device, then the second device is an intermediate device and determines information regarding the downstream device chain (by sending a <Request LIP support> message and by waiting for a <Report LIP support> message). If a report has been received from a downstream device, then a merged UUID may generated for the device chain. Eventually, a <Report LIP support> message may be sent to the first device.

Figure 3B:
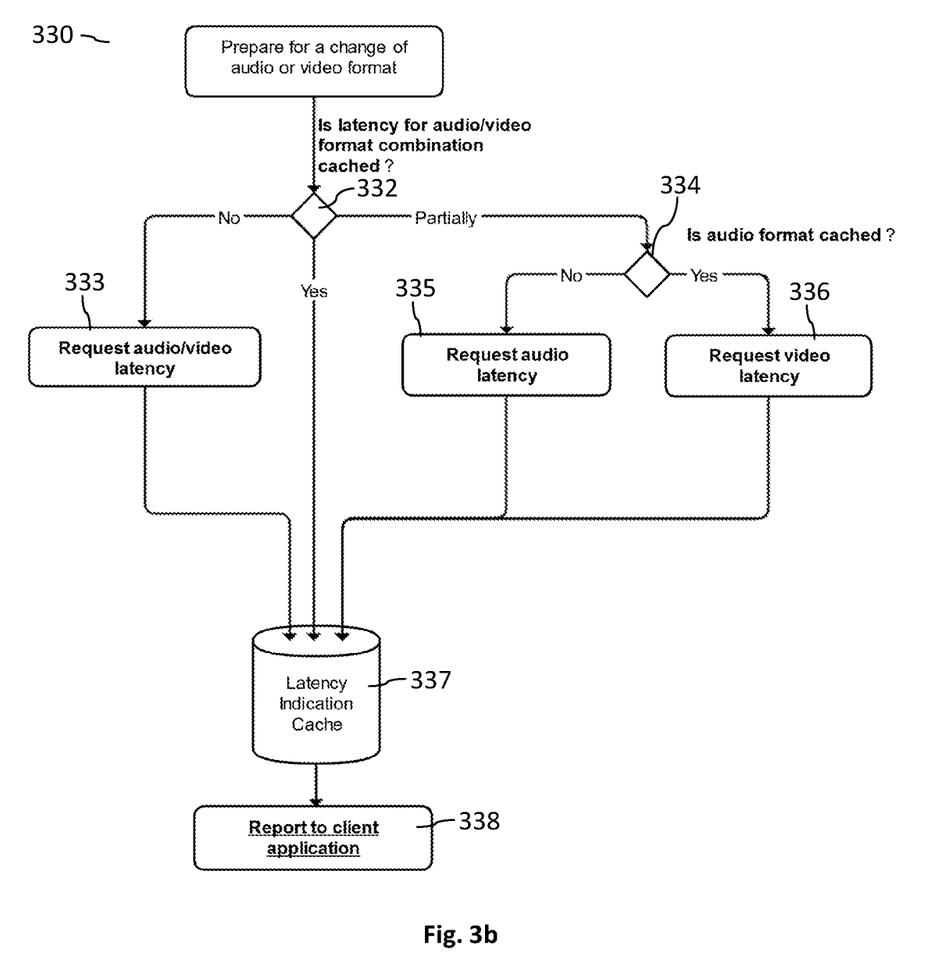
FIG. 3b shows a flow chart of an example method for changing an AV mode used within a device chain.

FIG. 3b shows a flow chart of an example method 330 for handling a change in audio and/or video format which is to be rendered. If a new AV mode is to be rendered, it may be verified whether the latency information for the new AV mode has been cached (step 332). If the new AV mode has already been cached, the latency information may be taken from the cache (step 337). Furthermore, the one or more playback delays may be adjusted based on the latency information. In addition, the HDMI format may be changed (for the new AV mode). Furthermore, the device may listen for a possible state change of the device chain 100. In addition, the latency information may be reported to a client application (step 338).

Figure 4:
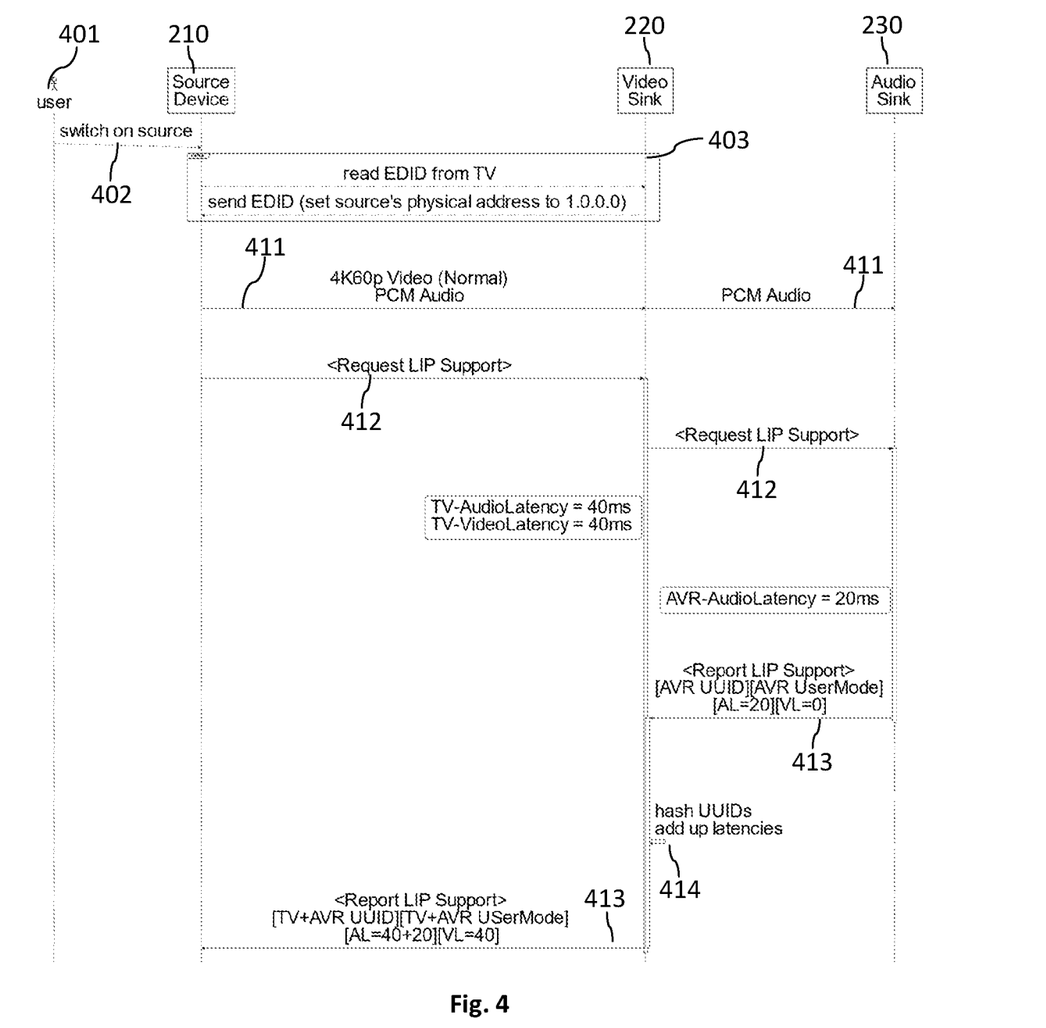
FIG. 4 shows an example messaging sequence for determining latency information within a device chain.

If the AV mode has not been cached, the audio latency and the video latency for the new AV mode may be determined using the LIP (step 333). If the AV mode has only been cached partially for audio only or for video only (step 334), the video latency may be determined (step 336) or the audio latency may be determined (step 335). FIG. 4 shows an example message sequence between a source device 210, a video sink device 220 (which is also an intermediate device with regards to the audio content) and an audio sink device 230. A user 402 may switch on the source device 210 (step 402). As a result of this, the addresses of the device chain 100 may be determined during an initialization phase 403. Furthermore, the source device 210 may inform the sink devices 220, 230 about the AV mode to be used (message 411). The source device 210 may request the sink devices 220, 230, whether LIP is supported (message 412). As part of the response message 413, the audio sink device 230 may report its audio latency, the (intermediate) video sink device 220 may add its audio latency (step 414) to determine a cumulated audio latency. Furthermore, the video sink device 220 may send a report 413 to the source device 210 which comprises the cumulated audio latency (of the chain comprising the video sink device 220 and the audio sink device 230) and the video latency of the video sink device 220.

The source device 210 may then render the audio content and the video content by taking into account the audio latency and the video latency (notably the difference between the audio latency and the video latency).

The user 401 may select a different AV mode (step 404). Subject to a change in AV mode, the source device 210 may sent a latency request message 415 to the sink devices 220, 230. The sink devices 220, 230 may respond with respective latency response messages 417 (indicating the cumulated audio latency and the video latency).

If the user 401 requests rendering content with the selected AV mode (step 405), the source device 210 may adjust the delay (step 406) of the audio content or the video content (in dependence of the difference between the cumulated audio latency and the video latency), and provide the AV content (step 416). The video sink device 220 may render the video content and pass through the audio content (step 407), and the audio sink device 230 may render the audio content (step 408).

Figure 5:
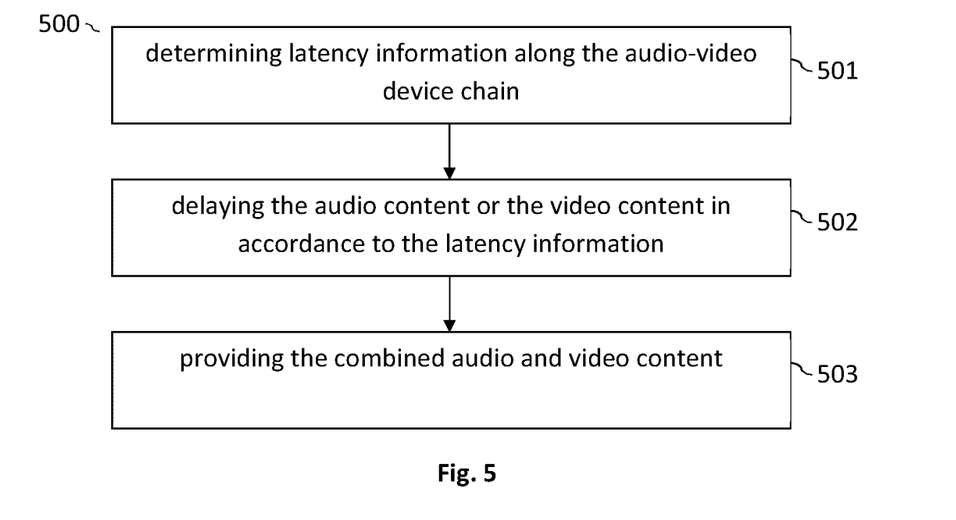
FIG. 5 shows a flow chart of an example method for rendering AV content.

FIG. 5 shows a flow chart of an example method 500 for providing combined audio and video content from a source device 210 to an audio sink device 230 (for rendering the audio content comprised within the combined AV content) and to a video sink device 220 (for rendering the video content comprised within the combined AV content). The combined AV content, the audio content and/or the video content may be transmitted along a device chain 100, 200 from the source device 210 to the respective sink device 220, 230. Apart from the source device 210 and the sink devices 220, 230, the device chain 100, 200 may comprise one or more intermediate devices which may be configured to forward the combined AV content, the video content and/or the audio content. It should be noted that the sink device 230 for the audio content may be an intermediate device for the video content, and/or the sink device 220 for the video content may be an intermediate device for the audio content. The method 500 may be executed (at least partially) by the source device 210 and/or by an intermediate device.

The audio sink device 230 may comprise and/or may be an audio receiver and/or a soundbar. The video sink device 220 may comprise or may be a TV set, and/or the source device 210 may comprise or may be a TV set, a settop-box, a video recorder, a disk player and/or a game console.

The method 500 may comprise determining 501 latency information regarding the latency of the device chain 100 for the combined AV content, for the audio content and/or for the video content. The latency information may be indicative of the video latency for processing the video content along the video device chain 100 (i.e. along the device chain 100 for transmitting and/or for processing the video content) between the source device 210 (or an intermediate device) and the video sink device 220. Alternatively, or in addition, the latency information may be indicative of the audio latency for processing the audio content along the audio device chain 100 (i.e. along the device chain 100 for transmitting and/or for processing the audio content) between the source device 210 (or an intermediate device) and the audio sink device 230. Alternatively, or in addition, the latency information may be indicative of the difference between the video latency and the audio latency (which is referred to herein also as the latency difference).

The latency information may be determined in a robust and efficient manner using the LIP protocol which is specified within the present document. Alternatively, or in addition, the latency information may be determined from a storage unit or a cache 215 of the source device 210 and/or of an intermediate device, wherein the storage unit or cache 215 is configured to store latency information for already known device chains 100 and/or for already known AV rendering modes.

The latency information may be determined (e.g. using the LIP protocol) by the source device 210 and/or by each intermediate device along the device chain 100, 200. In particular, the latency information may be passed from device to device in upstream direction from a sink device 220, 230 to the source device 210, in order to determine the cumulated audio latency and/or the cumulated video latency and/or the cumulated latency difference for the entire device chain 100, 200.

Furthermore, the method 500 may comprise delaying 502 the audio content or the video content in dependence of the latency information. The delaying 502 may be performed in an efficient manner by the source device 210. The audio content or the video content may be delayed in dependence of or exactly by the difference of the audio latency and the video latency. Alternatively, or in addition, the audio content or the video content may be delayed such that the extent of buffering, which is required for the synchronous rendering of the audio content at the audio sink device 230 with the video content at the video sink device 220 is reduced or completely cancelled. In other words, the audio content or the video content may be delayed such that only reduced or no buffering of the audio content at the audio sink device 230 and/or of the video content at the video sink device 220 is required (for the purpose of synchronizing the audio content with the video content). In particular, the audio content or the video content may be delayed such that the audio content is delayed with respect to the video content, if the video latency is higher than the audio latency; and/or such that the video content is delayed with respect to the audio content, if the audio latency is higher than the video latency.

In addition, the method 500 may comprise providing 503 the combined audio and video content with the delayed audio content or the delayed video content, thereby enabling a resource efficient rendering of the combined audio and video content at the respective sink devices 220, 230. The combined audio and video content may be transmitted from the source device 210 to the audio sink device 230 and/or to the video sink device 220 using one or more transmission interfaces 111, 112. The transmission interface 111, 112 may be the High Definition Multimedia Interface (HDMI). The latency information may be determined using messages 241, 242 which are exchanged between the source device 210 and the audio sink device 230 and/or the video sink device 220 using the transmission interface 111, 112. In particular, the messages 241, 242 for determining the latency information may be transmitted using the Consumer Electronics Control (CEC) communication channel of HDMI. Hence, the LIP protocol for determining the latency information may be integrated within the transmission interface 111, 112 which is used for transmitting the combined AV content, thereby enabling an efficient and robust determination of the latency information.

The method may comprise determining whether the audio sink device 230 and/or the video sink device 220 support the latency indication protocol (LIP) for providing latency information from the audio sink device 230 and/or from the video sink device 220 to the source device 210. This may be determined by using one or more specific messages 241, 242 defined within the LIP protocol.

Default latency information (such as defined in the IEC61937 audio standard and HDMI DALS (Dynamic Auto Lip-sync) for dynamic video latency reporting) may be used, if it is determined that the audio sink device 230 and/or the video sink device 220 do not support the LIP protocol. Alternatively, the latency information which is provided by the audio sink device 230 and/or the video sink device 220 (and/or by one or more intermediate devices along the device chain 100) may be used, if it is determined that the audio sink device 230 and/or the video sink device 220 support the LIP protocol. As a result of this, a robust provision of combined AV content may be ensured.

As indicated above, the audio content of the combined audio and video content may be provided to the audio sink device 230 via at least one intermediate device (which may be the video sink device 220). The method 500 may comprise providing latency information to the source device 210 which is indicative of and/or which takes into account the cumulated latency incurred by processing of the audio content in the intermediate device and incurred by processing of the audio content in the audio sink device 230. In particular, the one or more intermediate devices may each be configured to add the latency incurred by processing of the audio content in the respective intermediate device to the latency incurred by processing of the audio content in the audio sink device 230, in order to determine the cumulated latency, which is then passed upstream towards the source device 210. In particular, each intermediate device may be configured to add its own audio latency to the (cumulated) audio latency received from a downstream device, thereby providing a cumulated audio latency to the source device 210 which precisely reflects the audio latency of the entire audio device chain 100.

In an analogous manner, the video content of the combined audio and video content may be provided to the video sink device 220 via an intermediate device (which may be the audio sink device 230). The method 500 may comprise providing latency information to the source device 210 which is indicative of and/or which takes into account the cumulated latency incurred by processing of the video content in the intermediate device and incurred by processing of the video content in the video sink device 220. In particular, the one or more intermediate devices may each be configured to add the video latency incurred by processing of the video content in the respective intermediate device to the video latency incurred by processing of the video content in the video sink device 220, in order to determine the cumulated video latency, which is then passed upstream towards the source device 210. In particular, each intermediate device may be configured to add its own video latency to the (cumulated) video latency received from the (next) downstream device, thereby providing a cumulated video latency to the source device 210 which precisely reflects the video latency of the entire video device chain 100.

As indicated above, the audio and/or video device chain 100 may comprise a sequence or a chain of devices. A device may be directly followed within the chain (in the downstream direction from the source device 210 to a sink device 220, 230) by a downstream device. On the other hand, a device may be followed within the chain (in the upstream direction from a sink device 220, 230 to a source device 210) by an upstream device. In order to distinguish two different devices along a device chain 100, reference is made to an upstream device and to a downstream device, wherein the upstream device is upstream with regards to the downstream device, and wherein the downstream device is downstream with regards to the upstream device.

The method 500 may comprise sending a <request latency information> message from an upstream device of the audio and/or video device chain 100 to a downstream device of the audio and/or video device chain 100. The <request latency information> message may be directed at requesting latency information from the downstream device. The <request latency information> message may be directed at requesting latency information regarding the audio latency only; at requesting latency information regarding the video latency only; or at requesting latency information regarding the audio latency and the video latency. In particular, different types (notably three different types) of <request latency information> messages may be provided within the LIP protocol for the different types of latency information. By doing this, the protocol overhead may be reduced (as only the needed latency information may be requested).

The method may further comprise (in response to sending a <request latency information> message) receiving a <report latency information> message at the upstream device from the downstream device. The <report latency information> message may comprise the latency information (e.g. the cumulated latency) regarding the subset of the audio and/or video device chain 100 from the downstream device to the audio sink device 230 and/or the video sink device 220. The latency information may correspond to the information that has been requested within the <request latency information> message.

An intermediate device which receives a <request latency information> message from an upstream device may be configured to send a further <request latency information> message to its downstream device along the device chain 100, in order to determine the latency information for the partial device chain from the downstream device to the sink device 220, 230. The intermediate device may then receive a <report latency information> message from the downstream device, which includes the latency information for the partial device chain from the downstream device to the sink device 220, 230. The intermediate device may then add its own latency, and provide a <report latency information> message to the upstream device, which indicates the latency information (notably the cumulated latency) for the partial device chain from the intermediate device to the sink device 220, 230. By making use of <request latency information> messages which are sent in downstream direction and corresponding <report latency information> messages which are sent in upstream direction, the latency information for a device chain 100 may be determined in a robust and efficient manner.

A <request latency information> message may be indicative of an audio and/or video rendering mode which is to be used by the audio sink device 230 and/or the video sink device 220 for rendering the audio content and/or the video content, respectively. A downstream device which receives the <request latency information> message may take into account the indicated AV rendering mode for determining the latency information. By doing this, different AV rendering modes (e.g. for different audio formats and/or video formats) may be used within a device chain 100, thereby increasing the flexibility of a device chain 100.

The method 500 may comprise sending a <request protocol support> message from an upstream device of the audio and/or video device chain 100 to a downstream device of the audio and/or video device chain 100. The <request protocol support> message may be directed at receiving information from the downstream device on whether the downstream device supports the latency indication protocol (LIP) for providing latency information from the audio sink device 230 and/or the video sink device 220 to the source device 210.

The method 500 may further comprise receiving a <report protocol support> message at the upstream device from the downstream device, wherein the <report protocol support> message may comprise an indication that the downstream device supports the LIP protocol. Alternatively, or in addition, the <report protocol support> message may comprise latency information regarding a subset of the audio and/or video device chain 100 from the downstream device to the audio sink device 230 and/or the video sink device 220. Alternatively, or in addition, the <report protocol support> message may comprise an (unique) identifier (e.g. a hash value) for the subset of the audio and/or video device chain 100 from the downstream device to the audio sink device 230 and/or the video sink device 220. Alternatively, or in addition, the <report protocol support> message may comprise an indication of the audio and/or video (AV) rendering mode which is used by the audio sink device 230 and/or the video sink device 220.

By making use of a <request protocol support> message which is sent in the downstream direction of a device chain 100 and a corresponding <report protocol support> message which is sent in the upstream direction, the status, the capabilities and/or the structure of the device chain 100 may be determined in an efficient and precise manner.

The method 500 may comprise determining an (unique) identifier for the (complete) audio and/or video device chain 100 from the source device 210 to the audio sink device 230 and/or the video sink device 220 and/or an identifier for the partial device chain 100 from an intermediate device of the audio and/or video device chain 100 to the audio sink device 230 and/or the video sink device 220. The identifier may be determined by the source device 210 or by an intermediate device using an exchange of a <request protocol support> message and of a corresponding <report protocol support> message.

The method 500 may further comprise verifying whether the identifier is part of a list of known identifiers for which the latency information is stored on a storage unit 215 (e.g. a cache). The source device 210 and/or an intermediate device may comprise a storage unit 215 for storing latency information for already known device chains 100 or partial device chains (which have e.g. been determined during previous initialization phases of a device chain 100). The stored information may be reused, thereby enabling the latency information to be determined in an efficient manner.

In particular, the method 500 may comprise determining the latency information from the storage unit 215 based on the identifier, if the identifier is part of the list of known identifiers for which the latency information is stored on the storage unit 215. Alternatively, or in addition, the method 500 may comprise saving the determined latency information in association with the identifier, as well as including the identifier into the list of known identifiers, if the identifier is not part of the list of known identifiers. As a result of this, the communication overhead of the LIP protocol for determining latency information may be reduced. Furthermore, the speed of initialization or startup of a device chain 100 may be increased.

Each device within the audio and/or video device chain 100 may exhibit a (physical) address. The address may be assigned in accordance to the HDMI CEC protocol. The identifier for an audio and/or video device chain 100 or for a partial device chain 100 may be dependent on the address of all devices within the respective device chain 100 that process the audio content and/or the video content. In particular, the identifier may comprise or may be a hash value of the concatenated addresses of the devices along a (partial) device chain 100. By doing this, a unique identifier for a (partial) device chain 100 may be provided in an efficient manner.

As indicated above, the method 500 may comprise providing an AV rendering mode which is indicative of the audio format of the audio content and/or of the video format of the video content of the combined AV content. The latency information may be determined in dependence of the AV rendering mode, thereby enabling a particularly efficient and robust rendering of different types of AV content.

The identifier of a (partial) device chain 100 may be dependent on the AV rendering mode, thereby further increasing the efficiency for reusing already determined latency information.

The method 500 may comprise determining that there is an audio element and/or a video element that does not need to be synchronized with the combined AV content and/or that should be rendered immediately. In other words, it may be determined (notably at the source device 210) that in addition to the combined AV content (which should be rendered in a synchronized manner), an audio element (e.g. a system sound) and/or a video element (e.g. a notification) should be rendered by the audio and/or the video sink device 230, 220.

The method 500 may comprise mixing the audio element and/or the video element with the combined AV content (to provide a further combined AV content) without delaying the audio element and/or the video element in dependence the determined latency information. In other words, the latency information of the device chain 100 may be ignored when providing the audio element and/or the video element thereby enabling an immediate rendering of the audio element and/or the video element (e.g. for providing a smooth user experience).

Furthermore, an intermediate device within a device chain 100 is described, wherein the intermediate device is configured to determine latency information regarding the (partial) device chain 100 from the intermediate device downstream towards the audio and/or video sink devices 220, 230. The latency information may be determined using the LIP protocol. As indicated above, the latency information may be indicative of the video latency for processing the video content of combined AV content along the (partial) video device chain 100 between the intermediate device and the video sink device 220. Alternatively, or in addition, latency information may be indicative of the audio latency for processing the audio content of the combined AV content along the (partial) audio device chain between the intermediate device and the audio sink device 230. Alternatively, or in addition, latency information may be indicative of the latency difference between the video latency and the audio latency.

The intermediate device may be configured to communicate with a further device downstream of the intermediate device using a wireless link (such as WLAN, BT and/or WiSA). In this case, a transmission interface other than HDMI may be used. In particular, a proprietary and/or ad-hoc protocol may be used for the communication between the further device and the intermediate device. The intermediate device may be configured to receive latency information from the further device using the proprietary and/or ad-hoc protocol. Furthermore, the intermediate device may be configured to report upstream the latency information received from the further device together with its own latency information using the LIP protocol.

Hence, a method 500 and/or a device 210 are described which are configured to perform latency compensation based on a A/V latency report from one or more downstream devices within a device chain 100. As a result of this, latency compensation which requires a delay of video content does not have to be done in the decoded domain (at the video sink device 220) but can be achieved in the video compressed domain (at the source device 210), e.g. by altering the presentation and decoding timestamps of the audio content versus the video content.

Latency compensation at the source device 210 also allows to synchronize only audio and video elements that are to be presented synchronously. In a AV playback system, there may be audio and video assets that require synchronous presentation (e.g. movie playback) and other concurrent assets that may require immediate presentation (e.g. system sounds, notifications, etc.). By performing the latency compensation prior to the audio mixer and/or the video composer selectively only on the elements that are to be presented in sync a smooth user experience may be provided and/or latency for key assets that require immediate presentation may be reduced.

The latency information may be requested before playback start (e.g. at initialization of a device chain 100) for enabling an immediately correct AV synchronization. The HDMI LIP protocol which is described in the present document provides dynamic video latency information which may be based on the current AV playing mode (and not based on what may be played next).

Furthermore, a protocol enabling caching of latency information for an identified chain 100, 200 of downstream devices has been described, thereby enabling an efficient operation of a device chain 100. In particular, a chain of downstream devices (comprising e.g. the device A followed by the device B) may be identified with a different (unique) identifier than the device A alone or the device chain comprising the device B followed by the device A. The first device within a device chain may identify the complete active downstream chain. Whenever a further downstream device is turned off or on, the first device within the chain may update the identifier of the chain (thereby indicating that the device chain has been changed).

The cache 215 may enable the reduction of the amount of latency requests and reports, thereby saving bandwidth on the physical communication channel (HDMI-CEC) and thereby allowing for a quicker playback start. The cache 215 may be configured to store information on different chains, e.g. a chain consisting of device A only, and a chain consisting of device A followed by device B. Device A may be TV set and device B may be an AVR. The different device chains may be used depending on whether the TV set is playing audio and video or whether the TV set forwards the audio content to the AVR.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A method (500) for providing combined audio and video content from a source device (210) to an audio sink device (230) and to a video sink device (220); wherein the method (500) comprises,
    determining (501) latency information regarding
        a video latency for processing the video content of the combined audio and video content along a video device chain (100) between the source device (210) and the video sink device (220);
        an audio latency for processing the audio content of the combined audio and video content along an audio device chain (100) between the source device (210) and the audio sink device (230); and
        a latency difference between the video latency and the audio latency; and
    delaying (502) the audio content or the video content in dependence of the latency information; and
    providing (503) the combined audio and video content with the delayed audio content or the delayed video content.

2. The method (500) of claim 1, wherein
the combined audio and video content is transmitted from the source device (210) to one or more of the audio sink device (230) and the video sink device (220) using a transmission interface (111, 112); and the latency information is determined using messages (241, 242) which are exchanged between the source device (210) and at least one of the audio sink device (230) and the video sink device (220) using the transmission interface (111, 112).

3. The method (500) of claim 2, wherein the transmission interface (111, 112) comprises a High Definition Multimedia Interface, referred to as HDMI; and the messages (241, 242) for determining the latency information are transmitted using a Consumer Electronics Control, referred to as CEC, communication channel of HDMI.

4. The method (500) of claim 1, wherein the method (500) comprises determining whether one or more of the audio sink device (230) and the video sink device (220) support providing latency information from the audio sink device (230) or the video sink device (220) to the source device (210); and using default latency information, if it is determined that at least one of the audio sink device (230) and the video sink device (220) does not support providing latency information from the audio sink device (230) or the video sink device (220) to the source device (210); or using latency information provided by the audio sink device (230) or the video sink device (220), if it is determined that at least one of the audio sink device (230) and the video sink device (220) supports providing latency information from the audio sink device (230) or the video sink device (220) to the source device (210).

5. The method (500) of claim 1, wherein the audio content of the combined audio and video content is provided to the audio sink device (230) via an intermediate device; and the method (500) comprises providing latency information to the source device (210) which is indicative of or which takes into account a cumulated latency incurred by processing of the audio content in the intermediate device and by processing of the audio content in the audio sink device (230).

6. The method (500) of claim 5, wherein the video content of the combined audio and video content is provided to the video sink device (220) via an intermediate device; and the method (500) comprises providing latency information to the source device (210) which is indicative of or which takes into account a cumulated latency incurred by processing of the video content in the intermediate device and by processing of the video content in the video sink device (220).

7. The method (500) of claim 5, wherein the method (500) comprises adding the latency incurred by processing one or more of the audio content and the video content in the intermediate device to the latency incurred by processing of the audio content in the audio sink device (230) or by processing of the video content in the video sink device (220), respectively, to determine the cumulated latency.

8. The method (500) of claim 1, wherein the method (500) comprises sending a <request latency information> message from an upstream device of at least one of the audio device chain (100) and the video device chain (100) to a downstream device of the audio device chain (100) or the video device chain (100), respectively; wherein the <request latency information> message is directed at requesting latency information from the downstream device; and receiving a <report latency information> message at the upstream device from the downstream device; wherein the <report latency information> message comprises latency information regarding a subset of at least one of the audio device chain (100) and the video device chain (100) from the downstream device to one or more of the audio sink device (230) and the video sink device (220).

9. The method (500) of claim 8, wherein the <request latency information> message is directed at requesting latency information regarding the audio latency only;

latency information regarding the video latency only; or latency information regarding the audio latency and the video latency.

10. The method (500) of claim 8, wherein the <request latency information> message is indicative of one or more of an audio rendering mode which is to be used by the audio sink device (230) for rendering the audio content; and a video rendering mode which is to be used by the video sink device (220) for rendering the video content.

11. The method (500) of claim 1, wherein the method (500) comprises sending a <request protocol support> message from an upstream device of at least one of the audio device chain (100) and the video device chain (100) to a downstream device of the audio device chain (100) or the video device chain (100), respectively; wherein the <request protocol support > message is directed at receiving information from the downstream device on whether the downstream device supports providing latency information from one or more of the audio sink device (230) and the video sink device (220) to the source device (210); and receiving a <report protocol support > message at the upstream device from the downstream device; wherein the <report protocol support > message comprises an indication that the downstream device supports providing latency information from the audio sink device (230) or the video sink device (220) to the source device (210).

12. The method (500) of claim 11, wherein the <report protocol support > message comprises one or more of latency information regarding a subset of one or more of the audio device chain (100) and the video device chain (100) from the downstream device to one or more of the audio sink device (230) and the video sink device (220), respectively; and an identifier for the subset of one or more of the audio device chain (100) and the video device chain (100) from the downstream device to one or more of the audio sink device (230) and the video sink device (220), respectively; and an indication of an audio rendering mode which is used by the audio sink device (230); and an indication of a video rendering mode which is used by the video sink device (220).

13. The method (500) of claim 1, wherein the method (500) comprises determining an identifier for one or more of the audio device chain (100) and the video device chain (100) from the source device (210) to one or more of the audio sink device (230) and the video sink device (220), respectively; or determining an identifier for a partial device chain (100) from an intermediate device of one or more of the audio device chain (100) and the video device chain (100) to one or more of the audio sink device (230) and the video sink device (220), respectively; and verifying whether the identifier is part of a list of known identifiers; and determining the latency information from a storage unit (215) based on the identifier, if the identifier is part of the list of known identifiers for which the latency information is stored on the storage unit (215); or saving the determined latency information in association with the identifier and including the identifier into the list of known identifiers, if the identifier is not part of the list of known identifiers.

14. The method (500) of claim 13, wherein each device within one or more of the audio device chain (100) and the video device chain (100) exhibits an address; and the identifier for one or more of the audio device chain (100) and the video device chain (100) or for the partial device chain (100) is dependent on the address of all devices within the respective device chain (100) that process one or more of the audio content and the video content.

15. The method (500) of claim 1, wherein the method (500) comprises providing an AV rendering mode which is indicative of one or more of an audio format of the audio content and a video format of the video content; and determining the latency information in dependence of the AV rendering mode.

16. The method (500) of claim 15 referring back to any of claims 13 to 14; wherein the identifier is dependent on the AV rendering mode.

17. The method (500) of claim 1, wherein the audio sink device (230) comprises one or more of an audio receiver and a soundbar; and/or the video sink device (220) comprises a TV set; or the source device (210) comprises one or more of a TV set, a settop-box, a video recorder, a disk player and a game console.

18. The method (500) of claim 1, wherein the audio content or the video content is delayed according to one or more of the following in dependence of or exactly by the difference of the audio latency and the video latency; or such that an extent of buffering, which is required for a synchronous rendering of the audio content at the audio sink device (230) and of the video content at the video sink device (220) is reduced or completely cancelled; or such that the audio content is delayed with respect to the video content, if the video latency is higher than the audio latency; or such that the video content is delayed with respect to the audio content, if the audio latency is higher than the video latency.

19. The method (500) of claim 1, wherein the method (500) comprises, determining that there is one or more of an audio element and a video element that do not need to be synchronized with the combined AV content or that should be rendered immediately; and mixing one or more of the audio element and the video element with the combined AV content without delaying the audio element or the video element, respectively, in dependence of the determined latency information.

20. A source device (210) configured to provide combined audio and video content to an audio sink device (230) and to a video sink device (220); wherein the source device (210) is configured to determine latency information regarding one or more of a video latency for processing the video content of the combined audio and video content along a video device chain (100) between the source device (210) and the video sink device (220); and an audio latency for processing the audio content of the combined audio and video content along an audio device chain (100) between the source device (210) and the audio sink device (230); and a latency difference between the video latency and the audio latency; and delay the audio content or the video content in dependence of the latency information; and provide the combined audio and video content with the delayed audio content or the delayed video content.

* * * * *

UNITED STATES PATENT AND TRADEMARK OFFICE
CERTIFICATE OF CORRECTION

Page 1 of 1

PATENT NO. : 11,323,766 B2
APPLICATION NO. : 17/062442
DATED : May 3, 2022
INVENTOR(S) : Gael Lassure et al.

It is certified that error appears in the above-identified patent and that said Letters Patent is hereby corrected as shown below:

In the Claims

Column 24, Claim 20, Line 29, after "regarding", delete "one or more of".

Signed and Sealed this
Fourth Day of February, 2025

Coke Morgan Stewart
*Acting Director of the United States Patent and Trademark Office*